(12) United States Patent
Uhrenholt et al.

(10) Patent No.: US 10,943,323 B2
(45) Date of Patent: Mar. 9, 2021

(54) DATA PROCESSING SYSTEMS

(71) Applicant: Arm Limited, Cambridge (GB)

(72) Inventors: Olof Henrik Uhrenholt, Lomma (SE);
Sean Tristram LeGuay Ellis, Farnham (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/235,888

(22) Filed: Dec. 28, 2018

(65) Prior Publication Data

US 2020/0211146 A1    Jul. 2, 2020

(51) Int. Cl.
*G06F 15/80* (2006.01)
*G06T 1/20* (2006.01)
*G06F 1/329* (2019.01)

(52) U.S. Cl.
CPC ............... *G06T 1/20* (2013.01); *G06F 1/329* (2013.01)

(58) Field of Classification Search
CPC ..... G06T 1/20; G06T 15/005; G06T 2210/52; G09G 5/393; G09G 5/363
USPC ........................................................ 345/505
See application file for complete search history.

(56) References Cited

U.S. PATENT DOCUMENTS

| 2004/0093602 | A1 | 5/2004 | Huston et al. | |
| 2010/0191911 | A1* | 7/2010 | Heddes | G06F 15/16 711/118 |
| 2014/0123150 | A1 | 5/2014 | Lindholm et al. | |
| 2014/0354644 | A1* | 12/2014 | Nystad | G06T 1/20 345/426 |
| 2019/0121668 | A1* | 4/2019 | Knowles | G06F 9/462 |

OTHER PUBLICATIONS

Combined Search and Examination Report dated Sep. 2, 2020, U.K. Application No. GB1918400.1.

* cited by examiner

*Primary Examiner* — Gordon G Liu
(74) *Attorney, Agent, or Firm* — Vierra Magen Marcus LLP

(57) ABSTRACT

An instruction is included in a program, which instruction causes execution threads of a processor executing the program to determine whether they satisfy a condition which can only be satisfied by a subset of one or more execution threads at any one time. If a thread satisfies the condition, it executes subsequent instructions in the program. Otherwise, the thread sleeps. The subsequent instructions in the program can accordingly be executed by one execution thread subset at a time in serial order.

20 Claims, 5 Drawing Sheets

DATA PROCESSING SYSTEMS

BACKGROUND

The technology described herein relates to data processing systems, and in particular to graphics processing systems and the operation of graphics processors that include one or more programmable processing units ("shaders").

Graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". These shaders are programmable processing stages that execute shader programs on input data values to generate a desired set of output data for processing by the rest of the graphics pipeline and/or for output. The shaders of the graphics processing pipeline may share programmable processing circuitry, or they may each be distinct programmable processing units.

For example, in a typical graphics processing pipeline, shaders may be used to provide one or more of, and typically all of, a geometry shader, a vertex shader and a fragment (pixel) shader by executing appropriate shader programs. A graphics processor shader may also be used to perform more general processing tasks, e.g. as a compute shader by executing a compute shader program.

A graphics processing unit (GPU) shader core is thus a programmable processing unit that performs processing operations by running small programs for each "item" in an output to be generated such as a render target, e.g. frame (an "item" in this regard may be, e.g. a vertex or a fragment (pixel), or a compute shader work item). This generally enables a high degree of parallelism, in that a typical render output, e.g. frame, features a rather large number of vertices and fragments, each of which can be processed independently.

In graphics shader operation, each "item" will be processed by means of an execution thread which will execute the instructions of the shader program in question for the "item" in question. Typically, there will be multiple execution threads each executing at the same time (in parallel).

A shader program to be executed by a given "shader" of a graphics processing pipeline will typically be provided by an application that requires the graphics processing operations using a high level shader programming language, such as GLSL, HLSL, OpenCL, etc. This shader program will typically consist of "expressions" indicating desired programming steps defined in the relevant language standards (specifications). The high level shader program is then translated by a shader language compiler to binary code for the target graphics processing pipeline. This binary code will consist of "instructions" which are specified in the instruction set specification for the given target graphics processing pipeline.

The Applicants believe that there remains scope for improvements to data processing systems, and in particular to graphics processing systems and shader program execution in graphics processors.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
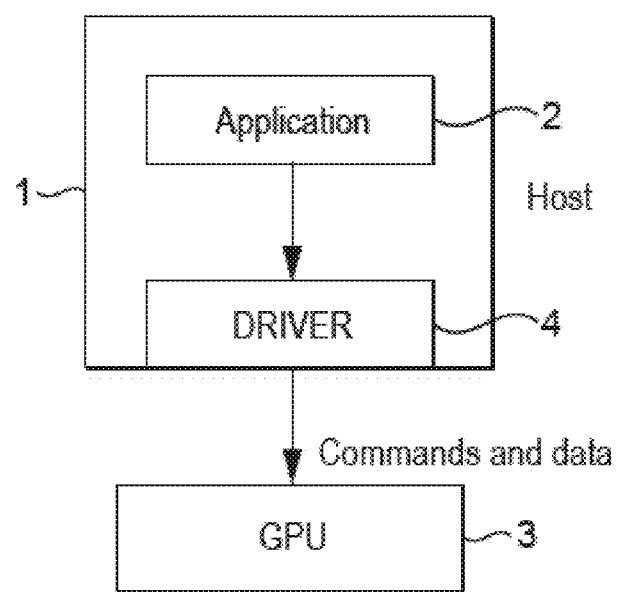
FIG. 1 shows an exemplary graphics processing system which may be operated in accordance with an embodiment of the technology described herein.

A first embodiment of the technology described herein comprises a method of operating a graphics processing system that comprises a graphics processor comprising a programmable execution unit operable to execute programs to perform processing operations, and in which a program can be executed by plural execution threads at the same time, the method comprising:

including in a program to be executed by the programmable execution unit of the graphics processor, an instruction which when executed by an execution thread will cause the execution thread to:
  determine whether the execution thread satisfies a condition associated with the instruction, the condition being such that only a subset of a set of plural execution threads will satisfy the condition at any one time; and to:
  when it is determined that the execution thread satisfies the condition, execute a set of one or more instructions associated with the instruction in the program; and
  when it is not determined that the execution thread satisfies the condition, sleep without first executing the set of one or more instructions associated with the instruction in the program;
the method further comprising, when the programmable execution unit is executing the program, an execution thread that is executing the program, in response to the instruction:
  determining whether the execution thread satisfies the condition;
  when it is determined that the execution thread satisfies the condition, executing the set of one or more instructions associated with the instruction in the program; and
  when it is not determined that the execution thread satisfies the condition, sleeping without first executing the set of one or more instructions associated with the instruction in the program.

A second embodiment of the technology described herein comprises a graphics processing system, the system comprising:
  a graphics processor comprising a programmable execution unit operable to execute programs to perform processing operations, and in which a program can be executed by plural execution threads at the same time; and
  processing circuitry configured to include in a program to be executed by the programmable execution unit of the graphics processor, an instruction which when executed by an execution thread will cause the execution thread to:

determine whether the execution thread satisfies a condition associated with the instruction, the condition being such that only a subset of a set of plural execution threads will satisfy the condition at any one time; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program;

wherein the programmable execution unit is configured such that, each execution thread in response to the instruction in a program being executed by the execution thread will:

determine whether the respective execution thread satisfies the condition;

when it is determined that the respective execution thread satisfies the condition, execute a set of one or more instructions associated with the instruction in the program; and when it is not determined that the respective execution thread satisfies the condition, sleep without first executing the set of one or more instructions associated with the instruction in the program.

The technology described herein also extends to the operation of a graphics processor in response to an instruction in accordance with the technology described herein.

Thus, a third embodiment of the technology described herein comprises a method of operating a graphics processor that comprises a programmable execution unit operable to execute programs to perform processing operations, and in which a program can be executed by plural execution threads at the same time, the method comprising:

an execution thread that is executing a program to perform a processing operation, in response to executing an instruction in the program that has an associated condition, the condition being such that only a subset of a set of plural execution threads will satisfy the condition at any one time:

determining whether the execution thread satisfies the condition associated with the instruction; and when it is determined that the execution thread satisfies the condition, executing a set of one or more instructions associated with the instruction in the program; and when it is not determined that the execution thread satisfies the condition, sleeping without first executing the set of one or more instructions associated with the instruction in the program.

A fourth embodiment of the technology described herein comprises a graphics processor comprising:

a programmable execution unit operable to execute programs to perform processing operations, and in which a program can be executed by plural execution threads at the same time;

wherein the programmable execution unit comprises processing circuitry configured such that an execution thread will, in response to executing an instruction in a program that has an associated condition, the condition being such that only a subset of a set of plural execution threads will satisfy the condition at any one time:

determine whether the execution thread satisfies the condition associated with the instruction;

when it is determined that the execution thread satisfies the condition, execute a set of one or more instructions associated with the instruction in the program; and when it is not determined that the execution thread satisfies the condition, sleep without first executing the set of one or more instructions associated with the instruction in the program.

The technology described herein is concerned with data processing systems, and in particular graphics processing program (shader program) execution by a programmable execution unit (shader) of a graphics processor (graphics processing unit (GPU)).

In the technology described herein, an instruction included in a (shader) program to be executed by the programmable execution unit (shader) has an associated "thread exclusivity condition", which condition can, at any one time, only be satisfied by a subset (i.e. some but not all) of a set of plural execution threads (e.g., and in an embodiment, and as will be discussed further below, only a single execution thread) (e.g. and in an embodiment, of the set of (all of the) plural execution threads that execute the program).

If a thread satisfies this "thread exclusivity condition", the thread will then execute a set of one or more instructions associated with, e.g. (and in an embodiment) following, the "thread exclusivity instruction" in the program. Otherwise (if the thread does not satisfy the thread exclusivity condition), the thread will sleep without first executing the set of one or more instructions associated with the thread exclusivity instruction in the program.

Thus, the thread exclusivity instruction can act as a "barrier" in the program, through which only a subset of (some but not all of) a set of plural execution threads (e.g. and in an embodiment, only a single execution thread) is allowed to "pass" at any one time.

This means that the set of instructions associated with, e.g. following, the thread exclusivity instruction in the program may only be executed by a desired execution thread subset (in an embodiment consisting of a single execution thread) (of (all of the) (plural) execution threads that execute the program) at any one time, while (all) other execution threads that have reached the thread exclusivity instruction in the program sleep without first executing the set of instructions.

As will be discussed further below, this can ensure that the set of instructions associated with the thread exclusivity instruction in the (shader) program is executed by, e.g. (only) one execution thread at a time and in a (particular, in an embodiment selected, in an embodiment predetermined) serial thread order.

Thus, for example, in the technology described herein, a first execution thread of the programmable execution unit satisfying the thread exclusivity condition at a first point in time can (and in an embodiment does) first execute the set of instructions associated with, e.g. following, the thread exclusivity instruction in the program to perform a processing operation for a first processing item. Then, after the processing operation has been performed for the first processing item, a second execution thread of the programmable execution unit (satisfying the thread exclusivity condition at a second, later point in time) can (and in an embodiment does) execute the set of instructions to perform the processing operation for a second processing item, and so on.

As will be discussed further below, the Applicants have recognised that, for some (graphics) processing operations, it may be desirable to be able to process (graphics) processing items in a strict serial order, i.e. one item after another.

The technology described herein provides a particularly efficient mechanism for allowing such serial processing of processing items, as in the technology described herein, only a, e.g. single execution thread satisfying the thread exclusivity condition is able to be "awake" to execute the set of instructions associated with the thread exclusivity instruction at any one time, while (all) other threads "sleep". Accordingly, the technology described herein can save processing power, as compared to e.g., "spinlock" arrangements. This is generally advantageous, but may be particularly beneficial in modern mobile devices such as smart phones, tablets, and the like where system resources are restricted.

(In contrast, when using a "spinlock" arrangement, for example, to ensure exclusive access to a resource by a thread, when the lock is obtained by one thread, other threads waiting to use the resource will repeatedly attempt to obtain the lock. Such repeated attempts, or "spinning", can consume significant processing resources, particularly in the case of a highly parallel multithreaded graphics processing unit (GPU), in which many threads may be trying to acquire the lock at any given time.)

It will be appreciated, therefore, that the technology described herein provides an improved data processing system, and in particular an improved graphics processing system, and improved shader program execution in graphics processors.

The programmable execution unit can be any suitable and desired programmable execution unit that a graphics processor (graphics processing unit (GPU)) may contain. The graphics processor may comprise a single or plural programmable execution units. Where there are plural programmable execution units, each execution unit can in an embodiment operate in the manner of the technology described herein.

A programmable execution unit can be implemented as desired and in any suitable manner. The programmable execution unit may comprise any suitable programmable hardware element such as programmable processing circuitry (circuit). It may be provided as a separate circuit element to other programmable stages of a graphics processing pipeline. However, it may also be at least partially formed of shared programmable graphics processing circuitry (circuit).

The programmable execution unit can execute any suitable and desired (graphics processing) (shader) program, such as a vertex shader program, a fragment shader program or a compute shader program (e.g. according to OpenCL, or DirectCompute). Correspondingly, the programmable execution unit should be able to perform processing operations for any suitable and desired processing items, such as vertices, fragments, primitives and compute shader work items.

The programmable execution unit (shader) should, and in an embodiment does, execute (instructions in) a (the) (shader) program for each processing item (e.g. vertex or fragment or work item) that the programmable execution unit (shader) receives for processing. In an embodiment, an execution thread is spawned for each item that the programmable execution unit (shader) receives for processing, and the programmable execution unit (shader) executes a (the) (shader) program for each so-spawned thread.

Thus, in an embodiment, each execution thread of plural execution threads executes the program for a respective processing item of a set of plural processing items to be processed for generating an output, such as a frame to be displayed.

The programmable execution unit (shader) should be operable to execute plural execution threads at the same time (in parallel) to perform processing operations for a plurality of processing items (at the same time (in parallel)).

In an embodiment, the programmable execution unit (shader) is operable to group execution threads executing a program into "groups" or "bundles" of threads, with the threads of one group executing the program together and in lockstep. This arrangement can improve program (shader) execution efficiency, since it is possible to, e.g., share instruction fetch and scheduling resources between all the threads in the group. (Other terms used for such thread groups include "sub-groups", "warps" and "wavefronts". For convenience the term thread group will be used herein, but this is intended to encompass all equivalent terms and arrangements, unless otherwise indicated.)

In an embodiment, the graphics processing system includes a, e.g. host, processor operable to issue graphics processing commands and data to the graphics processing unit (GPU). The, e.g. host, processor can be any suitable and desired processor, such as and in an embodiment a central processing unit (CPU), of the graphics processing system.

In an embodiment, the, e.g. host, processor of the graphics processing system is operable to generate graphics processing commands and data for the graphics processing unit (GPU) in response to instructions from an application executing on the processor. This is in an embodiment done by a driver for the graphics processing unit (GPU) that is executing on the, e.g. host, processor.

The program that the thread exclusivity instruction is included in can be any suitable and desired (shader) program that the programmable execution unit (shader) can execute to perform graphics processing operations (for graphics processing items).

The program should contain at least the thread exclusivity instruction, and the associated set of one or more instructions that can be (and in an embodiment are) executed by only a subset of execution threads (e.g. and in an embodiment, a single execution thread) (of the execution threads that execute the program) at any one time.

It will be appreciated that the program can, and in an embodiment does, also include other instructions, not associated with a thread exclusivity instruction, which need not be executed by only a subset of execution threads (e.g. and in an embodiment, a single execution thread) at any one time, e.g. that are to be (and in an embodiment are) executed by plural (e.g. all) execution threads of the programmable execution unit at the same time (e.g., and in an embodiment, in parallel and/or in lockstep within a thread group ("warp")), as desired and appropriate.

The (shader) program may contain only a single thread exclusivity instruction, or there may be plural thread exclusivity instructions included in the program. Correspondingly, the program may contain a single set or plural sets of one or more instructions, each set associated with a corresponding thread exclusivity instruction.

Thus, the program can, and in an embodiment does, include one or more sections of instructions to be executed (and that in an embodiment are executed) by only a subset of execution threads (e.g. and in an embodiment, a single execution thread) at any one time, each such section being associated with a corresponding thread exclusivity instruction, together (and interspersed) with one or more other sections of instructions which need not be executed by only a subset of execution threads at any one time, e.g. which are to be (and which in an embodiment are) executed by plural (e.g. all) execution threads at the same time (e.g., and in an embodiment, in parallel and/or in lockstep within a thread group ("warp")) (and which are not associated with a corresponding thread exclusivity instruction).

The Applicants have recognised that the technology described herein can provide a particularly flexible arrangement, whereby a single program can include both sections of code (instructions) to be executed by (only) a subset of execution threads (e.g. and in an embodiment, a single execution thread) at any one time, together with sections of code (instructions) to be executed by plural (e.g. all) execution threads e.g., at the same time (e.g., and in an embodiment, in parallel and/or in lockstep), as desired.

A thread exclusivity instruction in the program can be associated with a corresponding set of one or more instructions in any suitable and desired manner.

In an embodiment, a set of one or more instructions is associated with a thread exclusivity instruction by including the set of instructions following, in an embodiment immediately, the thread exclusivity instruction in the program. Thus the thread exclusivity instruction is in an embodiment (immediately) followed in the program by a set of one or more instructions that are thereby associated with the thread exclusivity instruction, and so will only be executed by a thread when the thread satisfies the associated thread exclusivity condition.

In an embodiment, there is also an indication of the extent of the set of one or more instructions that are associated with a (e.g. preceding) thread exclusivity instruction, e.g. when the set of instructions ends, and other instructions not associated with the thread exclusivity instruction begin. Thus, in an embodiment, the program includes, for each set of instructions, an "end" indication indicating the end of the set of one or more instructions in the program that are associated with the corresponding thread exclusivity instruction.

The end of the set of associated instructions can be indicated in any suitable and desired manner. For example, an "end" indication could be included with (indicated by) the associated thread exclusivity instruction, an instruction in the associated set of one or more instructions (e.g. the first or the last instruction in the set of instructions), or a (e.g. the first) instruction following an associated set of one or more instructions (that is not associated with the thread exclusivity instruction), e.g. in the form of a suitable modifier or flag, in the instruction in question.

In an embodiment, the program includes an "end" instruction that indicates the end of a set of instructions associated with a thread exclusivity instruction (and the start of a new section of instructions in the program not associated with the thread exclusivity instruction (that need not be executed by only a subset of execution threads at any one time, e.g. which can be executed by plural (e.g. all) execution threads at the same time)). In an embodiment, an end instruction follows, in an embodiment immediately, the associated set of one or more instructions in the shader program, to thereby indicate the end of the associated set of one or more instructions.

Other arrangements would be possible, if desired.

A thread exclusivity instruction can be included in a (shader) program in any suitable and desired manner.

As discussed above, typically a (shader) program will initially be provided using a high level (shader) programming language, such as GLSL, HLSL, OpenCL, C, etc., e.g. by an application executing on the, e.g. host, processor that requires graphics processing operations.

The high level (shader) program will then typically be translated by a (shader language) compiler to a binary code (shader) program including instructions for execution by the programmable execution unit. The compilation process for converting the shader language expressions to binary code instructions may take place via a number of intermediate representations of the program within the compiler. Thus the program written in the high level shader language may be translated into a compiler specific intermediate representation (and there may be several successive intermediate representations within the compiler), with the final intermediate representation being translated into the binary code instructions for the target graphics processing pipeline.

The compiler may, e.g., be part of the driver for the graphics processing unit (GPU) that is executing on the, e.g. host, processor. However, other arrangements would be possible.

Thus, the thread exclusivity instruction (and any corresponding end indication, e.g. instruction) will typically be included in the (compiled) program by a compiler compiling the program from a high level version of the program (application program code). Correspondingly, the processing circuitry configured to include the instruction in the program is in an embodiment a compiler for the programmable execution unit (shader).

It will be appreciated that the technology described herein also extends to the operation of a compiler including in a program that the compiler is compiling, an instruction in accordance with the technology described herein.

Thus, a fifth embodiment of the technology described herein comprises a method of compiling a program to be executed by a programmable execution unit of a graphics processor, the method comprising:

including in the program, an instruction which when executed by an execution thread will cause the execution thread to:

determine whether the execution thread satisfies a condition associated with the instruction, the condition being such that only a subset of a set of plural execution threads will satisfy the condition at any one time; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program.

A sixth embodiment of the technology described herein comprises a compiler for compiling a program to be executed by a programmable execution unit of a graphics processor, the compiler comprising:

processing circuitry configured to include in a program to be executed by the programmable execution unit of the graphics processor, an instruction which when executed by an execution thread will cause the execution thread to:

determine whether the execution thread satisfies a condition associated with the instruction, the condition being such that only a subset of a set of plural execution threads will satisfy the condition at any one time; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program.

As will be appreciated by those skilled in the art, these embodiments of the technology described herein can and in an embodiment do include one or more, and in an embodiment all, of the features of the technology described herein, as appropriate.

In an embodiment, the thread exclusivity instruction (and any corresponding end indication, e.g. instruction) is visible to the application program interface (API) and thus a programmer may explicitly include the instruction (and an end indication, e.g. instruction) in the (high level) application program code, with the compiler then including a corresponding instruction in the (complied) program in response thereto.

Thus, the method in an embodiment comprises (and the processing circuitry is correspondingly configured to) the compiler including the thread exclusivity instruction in the program in response to a corresponding instruction (expression) in application program code that the compiler is compiling.

In an embodiment, the compiler is configured also or instead to (be able to) automatically (of its own volition) include the instruction (and a corresponding end indication, e.g. instruction) in the (compiled) program, i.e. without the instruction having been included explicitly, e.g. by a programmer, in the application program code.

Thus in an embodiment the method comprises the step of (and the processing circuitry is correspondingly configured to): the compiler automatically inserting the thread exclusivity instruction (and a corresponding end indication, e.g. instruction) in the (compiled) program.

The compiler may automatically include the thread exclusivity instruction (and a corresponding end indication, e.g. instruction) in the (compiled) program in any suitable and desired way. For example, the compiler may be configured to identify opportunities to insert the instruction (and a corresponding end indication, e.g. instruction) in the program when compiling the application program code, e.g. by recognising one or more particular steps in the program code that should be executed by only a, e.g. single execution thread at any one time, e.g. because the steps should be executed by different execution threads of the programmable execution unit in a serial order.

The (shader) program can be suitable for, and include instructions (e.g., in the set of one or more instructions) for, performing any suitable and desired graphics processing operations. For example, and as discussed above, the program may be a vertex shader program and include instructions for performing vertex shading operations on vertices. Alternatively, the program may be a fragment shader program and include instructions for performing fragment shading operations on fragments. More generally, the program may be a compute shader program and include instructions for performing compute shading operations on compute shader work items.

In an embodiment, the program is for performing (and includes instructions to perform) graphics processing tiling operations.

Accordingly, in an embodiment, the graphics processing system and graphics processor (graphics processing unit (GPU)) uses so-called "tile-based" rendering. In tile-based rendering, the two-dimensional render output or target (i.e. the output of the rendering process, such as an output frame to be displayed) is rendered as a plurality of smaller area sub-regions, usually referred to as "tiles". The tiles are each rendered separately (typically one-after-another). The rendered tiles are then recombined to provide the complete rendering output (e.g. frame for display). In such arrangements, the render target (output) is typically divided (by area) into regularly-sized and shaped rendering tiles (they are usually e.g., squares or rectangles) but this is not essential.

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that graphics primitives that do not appear in a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those primitives that are actually present in a given rendering tile so as to, e.g., avoid unnecessarily rendering primitives that are not actually present in a tile. In order to facilitate this, it is known to prepare lists of the primitives to be rendered for the rendering tiles. Such lists can be prepared for single tiles or for sets of plural tiles together, and each such "primitive-list" (which can also be referred to as a "tile list") identifies (e.g. by reference to a primitive indicator) the primitives to be rendered for the tile (or tiles) in question.

The process of preparing primitive lists for tiles to be rendered is known as "tiling" and basically involves determining the primitives that should be rendered for a given rendering tile (or set of tiles). This tiling process is usually carried out by determining (at a desired level of accuracy) the primitives that intersect (i.e. that will appear (at least in part) within) the tile(s) in question, and then preparing a list of those primitives for future use by the graphics processing system (graphics processor). (It should be noted here that where a primitive falls into more than one tile (as will frequently be the case), it is included in the tile list for each tile that it falls within.) In effect, each tile can be considered to have a bin (the primitive-list) into which any primitive that is found to fall within (i.e. intersect) the tile is placed (and, indeed, the tiling process of sorting the primitives on a tile-by-tile basis in this manner is also commonly referred to as "binning").

Tiling can involve preparing primitive lists for only a single set of rendering tiles (e.g. which set encompasses the entire output frame), or for plural sets of rendering tiles that are arranged, e.g., in a hierarchical fashion. For example, at the "top level" of a hierarchy, a primitive list can be prepared in respect of the entire output frame. At the next "level" of the hierarchy, a primitive list can be prepared in respect of each of, e.g., four sub-regions that the frame area is divided into. At the next "level" of the hierarchy, a primitive list can be prepared in respect of each of, e.g., 16 sub-regions that the frame area is divided into, and so on, down to the "bottom level" of the hierarchy where primitive lists are prepared in respect of each individual rendering tile. Other arrangements for dividing a frame area into plural (hierarchically arranged) sets of rendering tiles are possible.

Thus, in an embodiment, the program that the thread exclusivity instruction is included in is a tiler program and includes instructions for tiling graphics primitives.

In this regards, the Applicants have recognised that tiling is normally performed in a graphics processing system using dedicated fixed function hardware. This is because the tiling process is conventionally seen as being more efficiently handled by fixed function hardware, as opposed to programmable, general purpose hardware.

However, the Applicants have now recognised that such fixed function hardware can disadvantageously take up a significant portion of the silicon area of a graphics processing unit (GPU), particularly in the case of lower end graphics processors. They have accordingly realised that it may be desirable to implement tiling using a (general purpose) programmable execution unit (shader) of a GPU, e.g., and in an embodiment, by executing an appropriate "tiling" compute shader program, so as to avoid dedicated fixed function tiling circuitry needing to be provided on the GPU.

However, the Applicants have recognised that one problem with implementing tiling on a programmable execution unit (shader) is that programmable execution units (shaders) are typically optimised to perform highly parallel processing, while the process of tiling includes a number of operations which must necessarily be performed in strict serial order (together with a number of other operations which can be performed (and which it may be desirable to perform) in a highly parallel manner).

For example, a set of primitives to be tiled for a given graphics processing output may typically be defined by a set of indices that indicates the corresponding vertices in a set of vertex data that are to be used for the primitives in question. (This arrangement can avoid, e.g., the need to duplicate vertices in the set of vertex data, as a single vertex entry in the vertex buffer can be referred to multiple times by reusing the relevant index in the set of indices.)

The set of indices can typically define one or more triangle strips, in which the last two indices of the previous primitive are used for the next primitive. (This arrangement means that only one extra index is required to create a new (adjacent) triangular primitive.) Corresponding arrangements are known and used for other primitive "types", such as triangle fans, line strips, line loops, etc.

In such arrangements, the set of indices can include one or more "primitive restarts", which indicate a position in the set of indices after which a new sequence of primitives, for example for a new triangle strip, is started.

However, where primitive restarts are used, it is typically necessary to analyse each primitive in the set of indices in turn before a "current" primitive that is being considered, in order to be able to identify the correct set of vertices for the "complete" current primitive. This means that the operation of fetching indices for primitives defined by a set of indices that includes primitive restarts must be performed in a strict serial order.

Another tiling operation that must be performed in strict serial order is the process of writing to primitive lists, particularly in the case where data is written to multiple levels of a hierarchy. In this case, writing primitives to primitive lists can be considered to be a read-modify-write action, which must be performed in serial order to avoid race conditions.

For example, a set of primitives to be tiled is typically arranged in a desired rendering order, which order must be preserved in the tiling process for rendering purposes. To preserve the rendering order within each primitive list, each primitive must be written in turn in the rendering order to the primitive lists.

Furthermore, where primitive list delta compression is used, a primitive is written to a primitive list in a compressed form based on a difference between the primitive and the previous primitive written to the primitive list, which is assumed to be the previous primitive in the rendering order. This means that a "current" primitive can only be written to a primitive list in the compressed form once all of the preceding primitives in the rendering order have been written to the primitive list. Accordingly, primitives must be written to primitive lists in the (serial) rendering order.

Thus, the tiling process may typically involve a first "serial" operation of fetching indices for primitives defined by a set of indices that includes primitive restarts, followed by a number of operations that may be performed in any order, e.g. (and in an embodiment) at the same time (in parallel), followed by a second "serial" operation of writing to primitive lists.

The intermediate (parallel) operations can include determining which tile or set of tiles to list a primitive for ("binning"). This can involve, for example, calculating a bounding box to a desired level of accuracy. The intermediate (parallel) operations can also include primitive culling operations, such as "backface" culling or "zero area" culling. It will be appreciated that these operations can be performed for a primitive independently of other primitives, and so can be (and in an embodiment are) performed in a parallel manner.

The Applicants have accordingly recognised that the arrangement of the technology described herein, in which thread exclusivity instructions can be included in a (shader) program so as to allow sections of code of the program to be executed by only a, e.g. single execution thread at any one time, is particular advantageous for being able to implement graphics tiling functions on a programmable execution unit (shader) of a GPU.

Thus, in an embodiment, the program is a (shader) program that performs graphics tiling (that prepares primitive lists for tile-based graphics processing), which includes one or more thread exclusivity instructions each associated with a corresponding "serial" section of code for performing tiling operations to be executed by only a single execution thread at any one time, together with one or more other sections of code (not associated with a thread exclusivity instruction) for performing tiling operations to be executed by plural execution threads at the same time (in parallel).

Thus, in an embodiment, the set of one or more instructions include instructions to: (i) fetch indices for primitives defined by a set of indices that includes primitive restarts; or (ii) write to primitive lists.

Thus, in an embodiment, the program includes a first thread exclusivity instruction associated with (followed by) a first set of instructions to fetch indices for primitives defined by a set of indices that includes primitive restarts. In an embodiment, a first "end" instruction then follows the first set of instructions. The program in an embodiment also includes a second set of instructions not associated with a thread exclusivity instruction, in an embodiment following the first set of instructions (and the first "end" instruction). The program in an embodiment (also) includes a second thread exclusivity instruction associated with (followed by) a third set of instructions to write primitives to primitive lists. In an embodiment, a second "end" instruction then follows the third set of instructions. It will be appreciated that in these embodiments, the condition is in an embodiment such that only a single execution thread will satisfy the condition at any one time, such that each "serial" section of code is executed for one primitive at a time.

In response to executing a thread exclusivity instruction included in a program, an (and each) execution thread determines whether it satisfies a thread exclusivity condition associated with the instruction.

A thread exclusivity condition can be associated with a thread exclusivity instruction in any suitable and desired manner. In an embodiment, the instruction indicates the condition that is to be applied, and a thread executing the instruction can interpret that indication accordingly. Where there are plural thread exclusivity instructions in a program, each thread exclusivity instruction is in an embodiment associated with a corresponding thread exclusivity condition (which may be the same as or different to the thread exclusivity condition of other instructions in the program).

A thread exclusivity condition (associated with a thread exclusivity instruction) can be any suitable and desired condition which can be (and is), at any one time, only satisfied by a subset (i.e. some but not all) of a set of plural execution threads.

In an embodiment, and as mentioned above, the subset consists of only a single execution thread from the set of plural execution threads. Thus, in an embodiment, the condition is such that only a single execution thread will satisfy the condition at any one time. As mentioned above, and as will be discussed further below, this means that the associated set of one or more instructions can be executed by (only) one execution thread at a time.

However, it may also or instead be desired to control a subset of plural execution threads to execute the associated set of one or more instructions. Thus, according to an embodiment, and as will be discussed further below, there are plural different subsets of execution threads, each subset consisting of one or more (e.g. plural) execution threads which in an embodiment execute the set of instructions one subset at a time.

Accordingly, the subset of execution threads should include some but not all of the execution threads in the set of plural execution threads, but can otherwise include any suitable and desired execution thread or threads from the set of plural execution threads.

For example, the subset can (and in an embodiment does) consist of one or more thread groups (one or more "warps"), and/or one or more subsets of threads within a thread group (e.g. one or more "quads"), and/or one or more individual threads (e.g. within a thread group or thread group subset), as desired and appropriate.

The set of plural execution threads should (and in an embodiment does) consist of the set of execution threads that is to execute the shader program in question, e.g., and in an embodiment, corresponding to a set of processing items for which the shader program is to be executed to process those processing items. This may correspond, e.g., to a set of processing items for all or part of an output (such as a frame or draw call) that the graphics processor is to generate.

Thus, in an embodiment, the thread exclusivity condition is a condition that can be (and is), at any one time, only satisfied by a subset (in an embodiment consisting of only a single execution thread) of a set of plural execution threads that are to execute the shader program that includes the thread exclusivity instruction.

In an embodiment, the (and each) thread exclusivity condition is such that each thread in the set of plural execution threads that are to execute the shader program including the thread exclusivity instruction will be able to (have the potential to) satisfy the thread exclusivity condition at a respective time (and to not satisfy the condition at another time). Thus the condition should be (and in an embodiment is) such that only a subset (in an embodiment consisting of only a single execution thread) of the set of plural execution threads that are to execute the shader program including the thread exclusivity instruction will satisfy the condition at any one time (while all other execution threads within the set of plural execution threads that are to execute the shader program including the thread exclusivity instruction will not satisfy the condition at that time).

Thus, the method in an embodiment comprises a first subset of one or more execution threads (in an embodiment consisting of a first single execution thread) satisfying the condition at a first point in time (and thereby executing instructions of the set of one or more instructions for a corresponding first subset of one or more processing items), and then a second subset of one or more execution threads (in an embodiment consisting of a second single execution thread) satisfying the condition at a second, later point in time (and thereby executing instructions of the set of one or more instructions for a corresponding second subset of one or more processing items) (and so on).

In an embodiment, the thread exclusivity condition is a condition that will be (and is) satisfied by (subsets of) the execution threads of the set of plural execution threads that are to execute the shader program that includes the thread exclusivity instruction in turn (and one at a time), in an embodiment in a particular (and controllable) thread order (within the set of plural execution threads).

In an embodiment, the thread exclusivity condition is such that (subsets of) the execution threads in the set of plural execution threads that are to execute the shader program including the thread exclusivity instruction can (and in an embodiment will) satisfy the condition in a particular, in an embodiment selected, in an embodiment predetermined, thread order, i.e. such that the set of plural threads that are to execute the shader program including the thread exclusivity instruction will satisfy the condition in a particular sequence of the (subsets of) threads in the set (e.g., and in an embodiment, a sequence of (subsets of) threads in age order, e.g., and in an embodiment, from oldest to youngest). Thus the condition is in an embodiment such that each execution thread (subset) in a set of plural execution threads that are to execute the shader program including the thread exclusivity instruction can (and in an embodiment will) satisfy the condition in a (particular, in an embodiment selected, in an embodiment predetermined) serial order.

In an embodiment, the thread exclusivity condition is such that once a thread has satisfied the condition (and has executed the associated set of one or more instructions in the program), that thread cannot satisfy the condition again. Thus, as a set of execution threads executes a shader program that includes the thread exclusivity instruction, there will be execution threads in the set that have already satisfied the condition in question (and executed instructions of the associated set of one or more instructions), and that can, accordingly, no longer satisfy the condition, and other execution threads that have still to (and that can still) satisfy the condition (and so have still to execute instructions of the associated set of one or more instructions in the program).

In an embodiment, a thread only executes instructions in the set of one or more instructions once the previous thread (subset) in the order has finished executing all of the instructions in the set of one or more instructions.

Thus, the arrangement is in an embodiment such that once a first (e.g. oldest) thread (subset) (in a desired order) has completed executing the set of instructions, the next (e.g. oldest) thread (subset) (in the desired order) executes the set of instructions, before the next (e.g. oldest) thread (subset) executes the set of instructions, and so on.

Thus, execution threads in an embodiment execute the set of instructions one thread (subset) at a time. In this way, (where each thread subset consists of only a single execution thread) the set of instructions can be executed by plural execution threads for a plurality of (processing) items in a desired serial order, one item at a time.

The properties of the thread exclusivity condition could be defined in the (high level) application program code, and may be exposed to application programmers. However, this need not be the case.

In an embodiment, the thread exclusivity condition is based on thread age (e.g., and in an embodiment, based on the order in which the threads were spawned in order to execute the program). For example, and in an embodiment, the thread exclusivity condition is such that (only) the oldest execution thread (i.e. the execution thread which was spawned earliest) that has still to satisfy the condition satisfies the condition.

Thus, in an embodiment, it is determined whether a (and each) thread satisfies the condition by determining whether the thread is the oldest execution thread (in a set of plural execution threads that are to execute the shader program including the thread exclusivity instruction) that has yet to satisfy the condition.

The age of a (and each) thread can be determined in any suitable and desired manner. In an embodiment, the age of a (and each) thread is measured using an identifier value associated with the thread (the thread's ID). For example, where the system allocates progressively increasing integer thread IDs to newly spawned threads in ascending order, the oldest thread should have the lowest thread ID. Other arrangements would be possible.

A (and each) thread may determine whether it satisfies the thread exclusivity condition in any suitable and desired manner.

A thread may be able to determine whether or not it satisfies the thread exclusivity condition by itself (e.g., without needing an external input). However, in an embodiment, the system comprises a thread exclusivity control unit operable to determine whether a thread or threads (and which thread) satisfies the thread exclusivity condition.

The thread exclusivity control unit can be provided in any suitable and desired manner. In an embodiment, the thread exclusivity control unit is provided as part of the graphics processor (graphics processing unit (GPU)) of the graphics processing system, and is operable to communicate with the programmable execution unit (shader), as appropriate. The thread exclusivity control unit may comprise any suitable hardware element such as programmable or fixed function processing circuitry (circuit).

Thus, in an embodiment, a (and each) thread determining whether the thread satisfies the thread exclusivity condition comprises the thread communicating with a thread exclusivity control unit of the (graphics processor of the) graphics processing system. In an embodiment, a (and each) thread communicates with the thread exclusivity control unit in response to the thread exclusivity instruction in the program.

A thread communicating with the thread exclusivity control unit to determine whether the thread satisfies the thread exclusivity condition can be achieved as desired.

In an embodiment, in response to a thread exclusivity instruction in the program, a (and each) thread sends a message (signal) to the thread exclusivity control unit to inform the thread exclusivity control unit that the thread has encountered the thread exclusivity instruction in the program. In an embodiment, the thread exclusivity control unit, in response to such a message (signal) received from a thread, then determines whether the thread satisfies the thread exclusivity condition. If it is determined that the thread satisfies the condition, the thread exclusivity control unit in an embodiment sends a return message (signal) to the thread to inform the thread that it satisfies the condition.

If it is not determined that the thread satisfies the condition (if it is determined that the thread does not satisfy the condition), the thread exclusivity control unit could send a return message (signal) to the thread to inform the thread that the condition is not satisfied. However, in an embodiment, if it is not determined that the thread satisfies the condition (if it is determined that the thread does not satisfy the condition), the thread exclusivity control unit does not send a return message (signal) to the thread. Thus, in this case, the lack of return message (signal) from the thread exclusivity control unit indicates that the thread exclusivity condition is not satisfied.

Thus, in an embodiment, a (and each) thread determining whether the thread satisfies the thread exclusivity condition comprises the thread, in response to the thread exclusivity instruction in the program, sending a message (signal) to a thread exclusivity control unit of the (graphics processor of the) graphics processing system, and determining that the thread satisfies the thread exclusivity condition when a corresponding return message (signal) is received from the thread exclusivity control unit. (And not determining that the thread satisfies the thread exclusivity condition when a corresponding return message (signal) is not received from the thread exclusivity control unit.)

Where the thread exclusivity control unit determines whether or not a thread satisfies the thread exclusivity condition, it may do this in any suitable and desired manner. In an embodiment, the thread exclusivity control unit is operable to keep track of which thread (subset) is next to satisfy the condition, for example, and in an embodiment, by tracking a property which it can use to determine the thread (subset) which should (next) satisfy the thread exclusivity condition.

The thread exclusivity could keep track of this in any suitable and desired manner, for example by keeping a record of which thread (subset) is next to satisfy the condition, and/or of which thread (subset) last satisfied the condition.

For example, and in an embodiment, the thread exclusivity control unit keeps a thread ID record (e.g. the thread ID of the thread which should (next) satisfy the thread exclusivity condition, and/or of the last thread which satisfied the condition), and uses the tracked thread ID to determine whether a thread satisfies the thread exclusivity condition.

Thus, in an embodiment, the thread exclusivity control unit determining whether a thread satisfies the thread exclusivity condition comprises the thread exclusivity control unit comparing the value of a property (e.g., and in an embodiment, the ID) of the thread with a value for that property that the thread exclusivity control unit is tracking.

As discussed above, any thread that does not satisfy the thread exclusivity condition when it executes the thread exclusivity instruction will sleep.

Thus, only a subset of one or more execution threads (in an embodiment consisting of only a single execution thread) can proceed to execute instructions of the set of one or more instructions at any one time, while any other execution threads that have reached the thread exclusivity instruction in the program but do not (and have still to) satisfy the condition (and execute instructions of the set of one or more instructions) will sleep.

A thread can sleep in any suitable and desired manner, but should, while sleeping, not execute the set of one or more instructions in the program (or any other instructions in the program).

As discussed above, in an embodiment, a (and each) thread in response to the thread exclusivity instruction in the program, sends a message (signal) to the thread exclusivity control unit of the (graphics processor of the) graphics processing system. In an embodiment, a (and each) thread then sleeps until a corresponding return message (signal) is received from the thread exclusivity control unit.

Thus, while the programmable execution unit is executing the program, there may be one or more threads that are sleeping (not executing instructions in the program) in response to executing the thread exclusivity instruction and not satisfying the associated thread exclusivity condition, as well as one or more other threads which have executed the instruction and satisfied the condition (and which may be "awake" and executing other instructions in the program). (There may also be one or more threads that have yet to reach the thread exclusivity instruction).

In an embodiment any threads that sleep in response to executing the thread exclusivity instruction are subsequently awoken so that they too execute the associated set of one or more instructions in the program. (Thus, the method in an embodiment comprises all the execution threads (in the set of plural execution threads) that are executing the program eventually executing the associated set of one or more instructions.)

In an embodiment, a (and each) sleeping execution thread proceeds to execute the instructions in the associated set of one or more instructions (only) when it satisfies the thread exclusivity condition.

Thus, in an embodiment, the method further comprises: determining whether a (and in an embodiment each) sleeping execution thread (which did not satisfy the thread exclusivity condition when it first executed that instruction) satisfies the thread exclusivity condition, and when it is determined that a sleeping execution thread satisfies the thread exclusivity condition, the execution thread (only) then executing the associated set of one or more instructions.

Any sleeping threads are in an embodiment awoken in response to a particular, in an embodiment selected, in an embodiment predetermined, trigger event, such as, and in an embodiment, a thread completing execution of the set of one or more instructions associated with the thread exclusivity instruction.

Thus, in an embodiment, the method further comprises (and the graphics processor comprises processing circuitry configured to) when a thread has completed execution of a set of one or more instructions associated with a thread exclusivity instruction, awakening an execution thread that was sleeping in response to the thread exclusivity instruction, and the awoken sleeping execution thread then either: determining whether it satisfies the thread exclusivity condition and either sleeping again or executing the associated set of one or more instructions, accordingly; or simply executing the instructions in the associated set of one or more instructions (e.g., and in an embodiment, and as will be discussed further below, in dependence upon whether the awakening of sleeping threads is controlled so as to only awaken a thread that is next to satisfy the thread exclusivity instruction or not).

It can be determined that a previous thread has finished executing all of the instructions in the set of one or more instructions in any suitable and desired manner, for example when the previous thread retires, or in response to a state change (such as a counter increment) that indicates that the set of instructions has been completed by the previous thread.

In an embodiment, when a thread executing the set of one or more instructions associated with a thread exclusivity instruction finishes executing those instructions, it sends an end message (signal) to the thread exclusivity control unit indicating that it has finished executing the set of instructions. In an embodiment, the thread sends an end message (signal) in response to an end indication, e.g. instruction, in the program (e.g. as described above). The thread exclusivity control unit correspondingly in an embodiment only awakens sleeping execution threads (e.g. the next sleeping thread in the order) (by sending a (return) message (signal)) once it has received an end message (signal) from the previous thread.

The waking of threads can be achieved in any suitable and desired manner. For example, one or more sleeping execution threads may be awoken (at the same time), with each awoken execution thread then executing the thread exclusivity instruction (again) to determine whether the thread (now) satisfies the associated thread exclusivity condition. For example, all sleeping threads may be awoken (at the same time), one or more thread groups ("warps") may be awoken (at the same time), one or more subsets of threads within a thread group (e.g. "quads"), or one or more individual threads (e.g. within a thread group) may be awoken (at the same time), as desired and appropriate, and each awoken thread may then execute the thread exclusivity instruction (again), to see if it now satisfies the condition.

In an embodiment, only the next thread (subset) satisfying the condition is awoken (in the case that that thread (subset) is sleeping) (while any other sleeping execution threads remain asleep). It will be appreciated that in this case, thread exclusivity can be ensured without needing to execute the thread exclusivity instruction (again). Thus, in this case, the single awoken thread (subset) in an embodiment continues by executing the set of one or more instructions in the program, without executing the thread exclusivity instruction (again).

The next thread (subset) satisfying the condition can be identified as desired. For example, and in an embodiment, a record of all currently sleeping threads and their relevant property values (e.g. IDs) can be maintained, and then compared to a record tracking which thread is to satisfy the condition next, with the sleeping thread (subset) to be awoken then selected accordingly.

A (and each) sleeping thread can be awoken using any suitable mechanism, e.g. in response to a suitable trigger. However, in an embodiment, the system controls sleeping threads to awake.

In an embodiment, sleeping threads are awoken by the thread exclusivity control unit, in an embodiment by the thread exclusivity control unit sending a message (signal) to a sleeping thread (e.g. and in an embodiment, a return message (signal) in response to a message (signal) sent by the thread to the thread exclusivity control unit in response to the thread exclusivity instruction) which causes the thread to awaken and continue executing instructions in the program.

Thus, the method in an embodiment comprises the thread exclusivity control unit determining whether a (and each) sleeping execution thread (which did not satisfy the thread exclusivity condition) now satisfies the thread exclusivity condition, and when it is determined that a sleeping execution thread satisfies the thread exclusivity condition, the thread exclusivity control unit awakening the sleeping execution thread so that the thread then executes the associated set of one or more instructions. (And when it is not determined that a sleeping execution thread satisfies the condition, not awakening that execution thread (leaving it to sleep).)

Once a thread has finished executing the set of one or more instructions (and any associated end instruction) associated with the thread exclusivity instruction, it may continue executing any other instructions in the program (not associated with the thread exclusivity instruction) as desired and appropriate.

In one embodiment, a (and each) thread may continue (without pausing) to execute instructions in the program not associated with the thread exclusivity instruction, e.g. following the set of one or more instructions (and corresponding end instruction). This may be appropriate, for example, where a thread can execute subsequent instructions independently of other execution threads.

However, in another embodiment, where an execution thread is associated with other execution threads (e.g. grouped with other threads in a thread group ("warp")), the operation is in an embodiment such that once a thread has finished executing the set of one or more instructions, it waits for other associated threads (e.g., and in an embodiment, threads within the same thread group ("warp")) to complete executing the set of one or more instructions, before continuing execution of the program (but the thread does not wait for other, "non-associated" threads (e.g., and in an embodiment, that are not part of the same thread group ("warp"))).

Thus, the operation is in an embodiment such that within a thread group ("warp"), threads will wait until all the threads in that thread group have completed executing the set of one or more instructions before continuing execution of instructions in the program beyond the set of one or more instructions. Once all of the threads of a given thread group ("warp") have completed executing the set of one or more instructions, the threads of that thread group ("warp") can, and in an embodiment do, continue execution of instructions in the program beyond the set of one or more instructions (in an embodiment in lockstep), even if other thread groups ("warps") have not yet completed executing the associated set of one or more instructions.

This means, for example, that once all of the threads within a particular thread group ("warp") have completed executing the set of one or more instructions, those threads can continue executing other instructions in the program in the desired lockstep manner, without needing to wait for threads for which it is not desired to execute instructions in lockstep with (i.e. without needing to wait for threads of other thread groups ("warps")).

The above operation can be achieved as desired, but in an embodiment a (and each) execution thread, when it has finished executing the associated set of one or more instructions, sends a message (signal) to the thread exclusivity control unit to inform the thread exclusivity control unit that the thread has finished. A thread may send such an "end" message (signal) in response to an end indication, e.g. instruction, in the program (e.g. as discussed above). The thread then sleeps (waits) until a corresponding return message (signal) is received from the thread exclusivity control unit, in response to which it awakens to continue executing subsequent instructions in the program.

Correspondingly, the thread exclusivity control unit in an embodiment waits until all execution threads within a thread group ("warp") have executed the associated set of one or more instructions in the program (and have sent an "end" message (signal) to the thread exclusivity control unit) and are sleeping, before awaking the threads in that thread group so that those threads can continue executing instructions.

The thread exclusivity control unit could awaken threads by sending individual messages (signals) to each thread in the thread group to cause each thread in the thread group to awaken and continue executing instructions. However, in an embodiment, the thread exclusivity control unit is operable to send a single message (signal) addressed to all threads in a thread group ("warp") to cause all of the threads in the thread group to awaken at the same time.

In an embodiment, where there are plural sets of instructions each associated with a respective thread exclusivity instruction, each set of instructions is treated independently of any other set of instructions, such that a thread or thread group ("warp") reaching a second set of instructions can proceed through that set of "serial" instructions (in the appropriate manner) without having to wait for any other threads or groups of threads ("warps") to have completed a previous set of "serial" instructions of the program.

Although the above has been described with particular reference to a graphics processor, a "thread exclusivity instruction" in accordance with the technology described herein may be included in any suitable program to be executed by any suitable processor which can execute a program by plural execution threads executing the program at the same time, such as a (multi-threaded) CPU. For example, according to an embodiment the instruction is included in an OpenCL program for execution by a processor (backend) capable of executing OpenCL.

Thus the technology described herein also extends more generally to a data processing system comprising a processor in which a program can be executed by plural execution threads at the same time.

Thus, another embodiment of the technology described herein comprises a method of operating a data processing system that comprises a processor operable to execute programs to perform processing operations, and in which a program can be executed by plural execution threads at the same time, the method comprising:

including in a program to be executed by the processor an instruction which when executed by an execution thread will cause the execution thread to:

determine whether the execution thread satisfies a condition associated with the instruction, the condition being such that only a subset of a set of plural execution threads will satisfy the condition at any one time; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program;

the method further comprising, when the processor is executing the program, an execution thread that is executing the program, in response to the instruction:

determining whether the execution thread satisfies the condition;

when it is determined that the execution thread satisfies the condition, executing the set of one or more instructions associated with the instruction in the program; and when it is not determined that the execution thread satisfies the condition, sleeping without first executing the set of one or more instructions associated with the instruction in the program.

Another embodiment of the technology described herein comprises a data processing system, the system comprising:

a processor comprising a programmable execution unit operable to execute programs to perform processing operations, and in which a program can be executed by plural execution threads at the same time; and processing circuitry configured to include in a program to be executed by the processor an instruction which when executed by an execution thread will cause the execution thread to:

determine whether the execution thread satisfies a condition associated with the instructions, the condition being such that only a subset of a set of plural execution threads will satisfy the condition at any one time; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program;

wherein the programmable execution unit of the processor is configured such that, each execution thread in response to the instruction in a program being executed by the execution thread will:

determine whether the respective execution thread satisfies the condition;

when it is determined that the respective execution thread satisfies the condition, execute a set of one or more instructions associated with the instruction in the program; and when it is not determined that the respective execution thread satisfies the condition, sleep without first executing the set of one or more instructions associated with the instruction in the program.

Another embodiment of the technology described herein comprises a processor operable to execute programs to perform processing operations, and in which a program can be executed by plural execution threads at the same time;

wherein the processor comprises processing circuitry configured such that each execution thread will, in response to executing an instruction in a program that has an associated condition, the condition being such that only a subset of a set of plural execution threads will satisfy the condition at any one time:

determine whether the respective execution thread satisfies the condition associated with the instruction;

when it is determined that the respective execution thread satisfies the condition, execute a set of one or more instructions associated with the instruction in the program; and when it is not determined that the respective execution thread satisfies the condition, sleep without first executing the set of one or more instructions associated with the instruction in the program.

Another embodiment of the technology described herein comprises a compiler for compiling a program to be executed by a processor, the processor being operable to execute a program by plural execution threads executing the program at the same time, the compiler comprising:

processing circuitry configured to include in a program to be executed by the processor, an instruction which when executed by an execution thread will cause the execution thread to:

determine whether the execution thread satisfies a condition associated with the instruction, the condition being such that only a subset of a set of plural execution threads will satisfy the condition at any one time; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program.

As will be appreciated by those skilled in the art, these embodiments of the technology described herein can and in an embodiment do include one or more, and in an embodiment all, of the features of the technology described herein, as appropriate. Thus, for example, the processor is in an embodiment a CPU or a graphics processor (GPU) (in an embodiment comprising a programmable processing unit, as described above).

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any suitable form or configuration of processor, such as graphics processors having a "pipelined" arrangement (in which case the graphics processor comprises a rendering pipeline).

As will be appreciated by those skilled in the art, the processor of the technology described herein may be part of an overall data (e.g., graphics) processing system that includes, e.g., and in an embodiment, a host processor that, e.g., executes applications that require processing by the (e.g., graphics) processor. The host processor will send appropriate commands and data to the processor to control it to perform (e.g., graphics) processing operations and to produce (e.g., graphics) processing output required by applications executing on the host processor. To facilitate this, the host processor should, and in an embodiment does, also execute a driver for the processor and a compiler or compilers for compiling programs to be executed by the (programmable execution unit of the graphics) processor.

The processor may also comprise, and/or be in communication with, one or more memories and/or memory devices that store the data described herein, and/or the output data generated by the processor, and/or store software (e.g. (shader) program) for performing the processes described herein. The processor may also be in communication with a host microprocessor, and/or with a display for displaying images based on the data generated by the (e.g., graphics) processor.

As well as any programmable processing (shader) stages, such as a vertex shader and fragment shader, the graphics processor and pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processor may output. Thus, it may be used when generating frames for display, render-to-texture outputs, etc. The output data values from the graphics processor are in an embodiment exported to external, e.g. main, memory, for storage and use.

The technology described herein is applicable to any suitable form or configuration of graphics processor. It is particularly applicable to tile-based graphics processors and graphics processing systems. Thus in an embodiment, the graphics processing system and graphics processor are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuitry/circuits) and/or programmable hardware elements (processing circuitry/circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, nontransitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

An embodiment of the technology described herein relates to execution threads of a programmable processing unit ("shader") of a graphics processor (GPU) of a graphics processing system executing a set of one or more instructions in a program in a serial order.

Such a system may be configured as shown in FIG. 1. FIG. 1 shows schematically a typical computer graphics processing system.

An application 2, such as a game, executing on a host processor 1 will require graphics processing operations to be performed by an associated graphics pipeline that is implemented by means of a graphics processing unit (GPU) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

Figure 2:
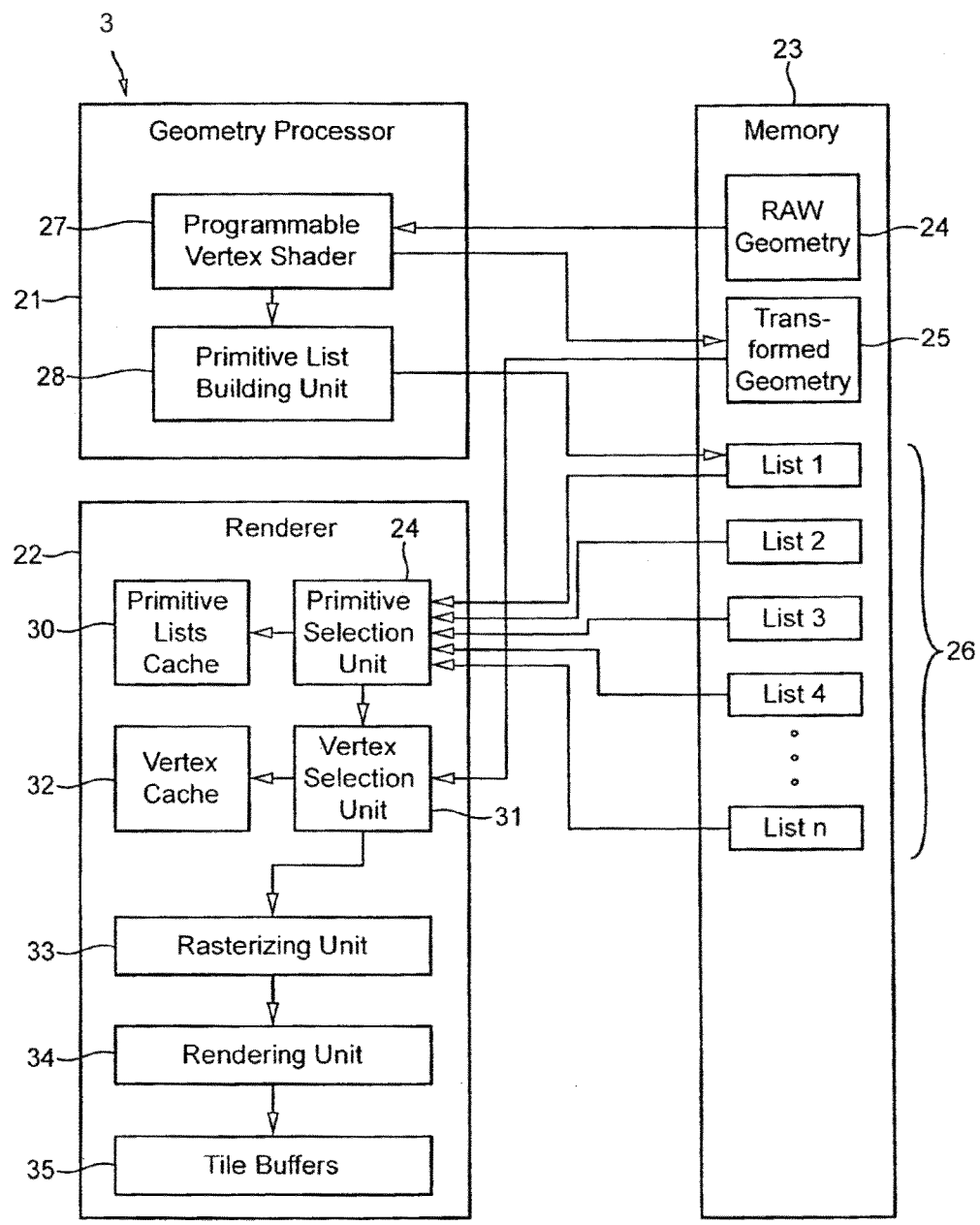
FIG. 2 shows schematically an arrangement of a graphics processor that can operate in accordance with the technology described herein.

FIG. 2 shows schematically the graphics processor 3 in more detail.

The graphics processor 3 shown in FIG. 2 is a tile-based graphics processing pipeline, and will thus produce tiles of a render output data array, such as an output frame to be generated.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processor 3. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processor 3 includes a geometry processor 21, and a renderer 22, both of which can access a memory 23. The memory 23 may be "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver 4 or an API running on the host system 1 (microprocessor)), a set of transformed geometry data 25 (which is the result of various transformation and processing operations carried out on the raw geometry 24), and a set of primitive lists 26. The primitive lists 26 contain data, commands, etc., for the respective primitives. The transformed geometry data 25 comprises, for example, transformed vertices (vertex data), etc.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the render output (e.g. frame to be displayed).

The primitive list building unit 28 performs the process of "tiling" to allocate primitives to the primitive lists which are then used by the renderer 22 to identify the primitives that should be rendered for each tile that is to be rendered to generate the render output (which in this embodiment is a frame to be rendered for display). To do this, the primitive list building unit 28 takes as its input the transformed and processed vertex (geometry) data 25 from the programmable vertex shader 27 (i.e. the positions of the primitives in the frame), builds primitive lists using that data, and stores those lists as the primitive lists 26 in the memory 23.

The renderer 22 includes a primitive selection unit 29, a primitive list cache 30, a vertex selection unit 31, a vertex data cache 32, a rasterising unit 33, a rendering unit 34, and tile buffers 35.

The rasterising unit 33, rendering unit 34, and tile buffers 35 operate, in this embodiment, in the usual manner for such units in graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to an output render target, such as a frame buffer for a display.

The primitive selection unit 29 of the renderer 22 determines which primitive is to be rendered next. It does this by considering the primitive lists 26 stored in the memory 23, and selecting from one of those lists the next primitive to be rendered. The primitive selection unit 29 can also place one or more primitive lists in the primitive list cache 30.

The primitive selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

The rasterising unit 33 then rasterises the primitive to fragments, and provides those fragments to the rendering unit 34 for rendering. The rendering unit 34 performs a number of rendering processes, such as texture mapping, blending, shading, etc. on the fragments, to generate rendered fragment data for the fragments representing the primitive, and stores the rendered fragment data in the tile buffers 35 for providing to an output render target, such as a frame buffer for a display.

Other arrangements for the graphics processing pipeline 3 would, of course, be possible.

As can be seen from FIG. 2, the graphics processing pipeline 3 includes a programmable vertex shader 27. Although not shown in FIG. 2, the graphics processing pipeline 3 typically includes a number of other programmable processing or "shader" stages, such as a hull shader, domain shader, geometry shader, and fragment shader. These programmable shader stages execute respective shader programs that have one or more input variables and generate sets of output variables and that are provided by the application, and are implemented by means of an appropriate (shader) execution core that is operable to execute shader programs. The execution core is also operable as a more general compute shader (to execute compute shader programs).

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

FIG. 2 shows schematically operation stages and functional units of the graphics processing unit 3.

Figure 3:
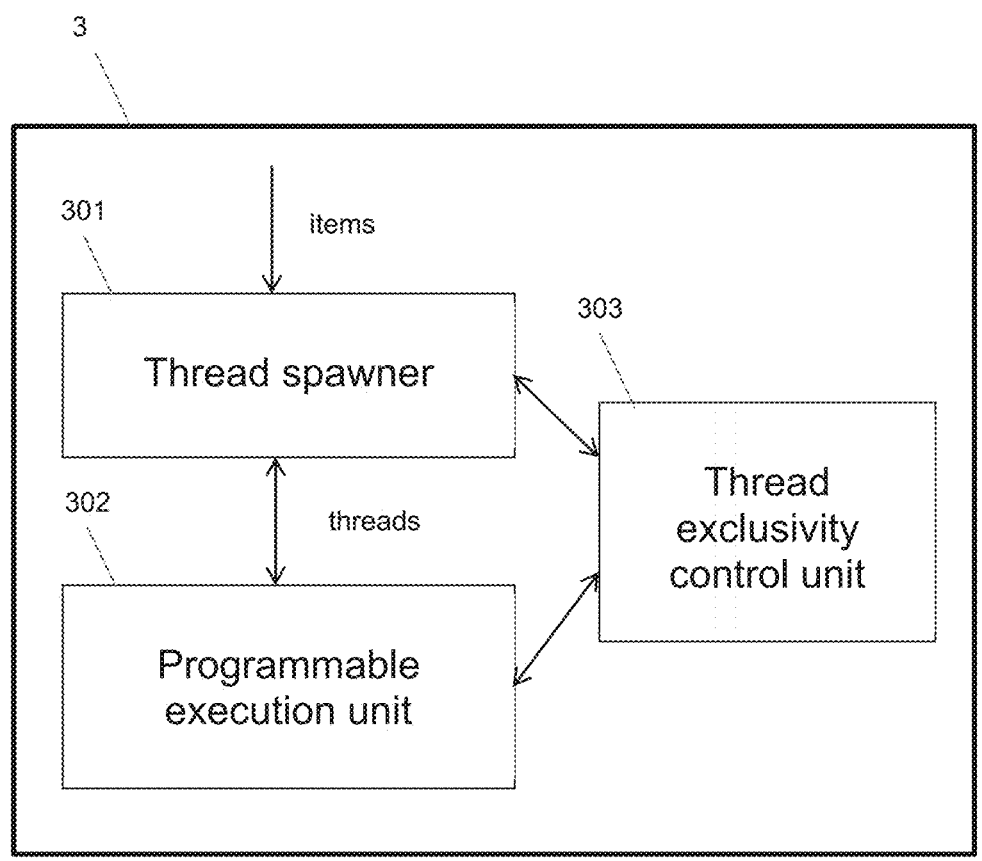
FIG. 3 shows schematically an embodiment of a graphics processing unit.

FIG. 3 shows the corresponding functional units of the graphics processing unit 3 that are used to perform (and thus to act as) various ones of the operation stages and functional units of the graphics processing pipeline 3 shown in FIG. 2 and that are relevant to the technology described herein. (There may be other functional units in the graphics processing unit 3. FIG. 3 shows those functional units that are relevant to operation in the manner of the technology described herein only for simplicity.)

As shown in FIG. 3, the graphics processor 3 includes a thread spawner 301, a programmable execution unit 302 and a thread exclusivity control unit 303.

The thread spawner 301 is operable to spawn execution threads for execution by the programmable execution unit 302 for (graphics) processing items, e.g. vertices, that it receives.

The programmable execution unit 302 operates to execute shader programs to perform the shader operations of the graphics processing pipeline, such as the hull shader, the vertex shader and the fragment shader. To do this, it receives execution threads from the thread spawner 301 and executes the relevant shader program for those execution threads.

The thread exclusivity control unit 303, as will be discussed further below, operates to ensure that for a set of instructions associated with a thread exclusivity instruction in a shader program that the programmable execution unit 302 is executing, only a single execution thread can execute that set of instructions at any one time.

Figure 4:
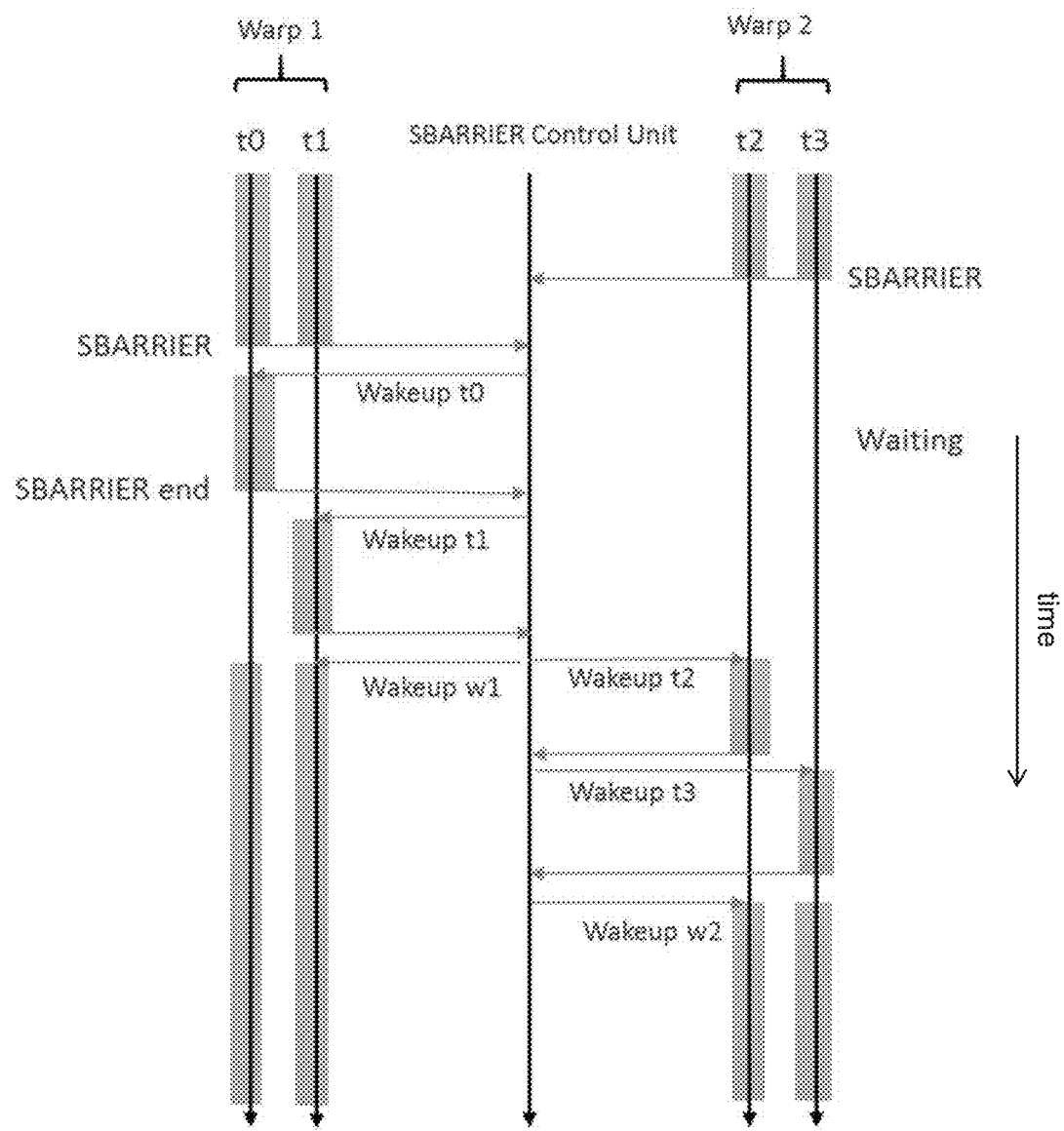
FIG. 4 shows schematically the execution of shader program in accordance with an embodiment of the technology described herein.

FIG. 4 illustrates schematically, as a function of time, the programmable execution unit 302 executing a shader program for two thread groups (warps), Warp 1 and Warp 2, according to an embodiment. For simplicity of illustration, FIG. 4 shows each warp consisting of two execution threads only. However, it will be appreciated that each warp may typically include more than two execution threads, e.g. 4, 8, 16 or more execution threads.

Thus, as shown in FIG. 4, in the present embodiment Warp 1 consists of threads t0 and t1, while Warp 2 consists of threads t2 and t3. Newly spawned threads are allocated integer threads IDs in ascending order, so in this case, thread t0 is the oldest thread, followed by thread t1, followed by thread t2, and thread t3 is the youngest thread. Each thread is executing the shader program to generate an output for a respective graphics item, e.g. vertex.

As shown in FIG. 4, threads t0 and t1 of Warp 1 are initially executing instructions in the shader program in parallel and in lockstep with each other, i.e. threads t0 and t1 execute the same single instruction in the shader program before moving onto the next instruction. As discussed above, threads within a warp executing instructions in lockstep with each other can improve shader execution efficiency. Similarly, threads t2 and t3 of Warp 2 initially execute instructions in the shader program in parallel and in lockstep with each other.

However, the threads of Warp 1 are not executing instructions in the shader program in lockstep with the threads of Warp 2. Thus, as shown in FIG. 4, in the present embodiment, threads t2 and t3 of Warp 2 reach a thread exclusivity instruction ("SBARRIER") in the shader program before threads t0 and t1 of Warp 1 reach that same instruction.

When a thread reaches "SBARRIER", in response to that instruction, the thread sends a message to the thread exclusivity control unit 303 ("SBARRIER Control Unit") to determine whether the thread satisfies a condition for proceeding with the execution of instructions beyond "SBARRIER" in the program. As discussed above, the condition is such that it can only be satisfied by a single execution thread at any one time. The thread exclusivity instruction ("SBARRIER") in the program thus acts as a "barrier", through which only a single execution thread is allowed to pass at any one time.

Thus, as shown in FIG. 4, in the present embodiment, threads t2 and t3 of Warp 2 each send respective messages to the control unit 303 when they reach the thread exclusivity instruction ("SBARRIER"), before threads t0 and t1 of Warp 1 each send respective messages to the control unit 303 when they reach the instruction in the program.

Once a thread has sent a message to the control unit 303 in response to "SBARRIER", the thread waits to receive a corresponding return message from the control unit 303, before continuing to execute any further instructions in the program. I.e. each thread "sleeps" without executing any further instructions following "SBARRIER" in the program, until a return, "wakeup", message from the control unit 303 is received.

The control unit 303 is operable to control the sending of "wakeup" messages to sleeping execution threads to control when threads are awoken to continue executing instructions in the program following "SBARRIER" In particular, the control unit 303 sends "wakeup" messages such that, at any one time, only a single execution thread will continue to execute instructions in the program following "SBARRIER".

As shown in FIG. 4, in the present embodiment the control unit 303 is operable to awaken (send "wakeup" messages to) sleeping execution threads to cause them to continue executing instructions in the shader program following "SBARRIER" in order of thread age.

Thus, as shown in FIG. 4, even though threads t2 and t3 reach "SBARRIER" and message the control unit 303 first, the control unit 303 waits until it has received a message from the oldest thread, thread t0, before sending a message ("Wakeup t0") to thread t0 to cause thread t0 to continue executing instructions in the program following "SBARRIER".

Then, the control unit 303 sends a "wakeup" message ("Wakeup t1") to the next oldest thread, thread t1, to cause thread t1 to continue executing instructions in the program following "SBARRIER".

Then, the control unit 303 sends a "wakeup" message ("Wakeup t2") to the next oldest thread, thread t2, to cause thread t2 to continue executing instructions in the program following "SBARRIER".

Finally, the control unit 303 sends a "wakeup" message ("Wakeup t3") to the youngest thread, thread t3, to cause thread t3 to continue executing instructions in the program following "SBARRIER".

In this way, the control unit 303 controls each thread to pass the "barrier" provided by the thread exclusivity instruction ("SBARRIER") in age order.

In the present embodiment, once a thread awakens in response to receiving a "wakeup" message from the control unit 303, the thread continues executing instructions in the program following the thread exclusivity instruction ("SBARRIER") until the thread reaches a corresponding end instruction ("SBARRIER end").

In response to an end instruction ("SBARRIER end") in the program, the thread sends an "end" message to the control unit 303 to inform the control unit 303 that the thread has encountered that end instruction in the shader program. Then, once a thread has sent an end message to the control unit 303, the thread again waits (sleeps) to receive a corresponding return, "wakeup" message from the control unit 303, before continuing to execute any further instructions following the end instruction ("SBARRIER end") in the program.

This allows the control unit 303 to control the execution of instructions in the program in between "SBARRIER" and "SBARRIER end". In particular, in the present embodiment, the control unit 303 is operable such that, at any one time, only a single execution thread can execute instructions in the program in between "SBARRIER" and "SBARRIER end" at any one time.

The thread exclusivity instruction ("SBARRIER") and corresponding end instruction ("SBARRIER end") thus act to define a "barriered" section of instructions in the shader program, which "barriered" section of instructions can only be executed by a single execution thread at any one time.

Thus, as shown in FIG. 4, in the present embodiment the control unit 303 is operable to awaken the next thread to execute the "barriered" section of instructions only after the previous thread has completed executing the "barriered" section of instructions.

Thus, as shown in FIG. 4, the control unit 303 waits until thread t0 has completed executing the "barriered" section of instructions and has sent an end message to the control unit 303 before sending a "wakeup" message ("Wakeup t1") to the next oldest thread, thread t1, to cause thread t1 to execute the "barriered" section of instructions.

Then, when thread t1 has completed executing the "barriered" section of instructions and has sent an end message to the control unit 303, the control unit 303 sends a "wakeup" message ("Wakeup t2") to the next oldest thread, thread t2, to cause thread t2 to execute the "barriered" section of instructions.

Then, when thread t2 has completed executing the "barriered" section of instructions and has sent an end message to the control unit 303, the control unit 303 sends a "wakeup" message ("Wakeup t3") to the youngest thread, thread t3, to cause thread t3 to execute the "barriered" section of instructions.

In this way, the control unit 303 controls each thread to execute the "barriered" section of instructions in between the thread exclusivity instruction ("SBARRIER") and the corresponding end instruction ("SBARRIER end") one thread at a time, in serial age order. Accordingly, the graphics processing operations defined by the "barriered" section of code are performed for respective graphics items in serial order, i.e. one item at a time.

In the present embodiment, once a thread has completed executing the "barriered" section on code, and is subsequently awoken by a "wakeup" message from the control unit 303, the thread can continue executing instructions in the program following the end instruction ("SBARRIER end").

Thus the control unit 303 is operable to control when threads are awoken to continue executing instructions in the program following the end instruction ("SBARRIER end") (as well as, as described above, when threads are awoken to continue executing instructions in the program following the corresponding thread exclusivity instruction ("SBARRIER")).

In particular, in the present embodiment, the control unit 303 is operable to only allow threads to continue executing instructions in the program following an end instruction ("SBARRIER end") once all of the other threads within the same warp have completed executing the "barriered" section of instructions in between "SBARRIER" and "SBARRIER end".

Thus, as shown in FIG. 4, once threads t0 and t1 of Warp 1 have both completed executing the "barriered" section of code, the control unit 303 sends a "warp wakeup" message ("Wakeup w1") to the threads of Warp 1 (i.e. to threads t0 and t1) to cause the threads of Warp 1 to continue executing instructions in the program following "SBARRIER end", even though threads t2 and t3 of Warp 2 have not yet finished executing the "barriered" section of code.

As shown in FIG. 4, threads t0 and t1 of Warp 1 then continue to execute instructions in the program following "SBARRIER end" in parallel and in lockstep with each other.

Then, once threads t2 and t3 of Warp 2 have both completed executing the "barriered" section of code, the control unit 303 sends a "warp wakeup" message ("Wakeup w2") to the threads of Warp 2 (i.e. to threads t2 and t3) to cause the threads of Warp 2 to continue executing instructions in the program following "SBARRIER end".

Threads t2 and t3 of Warp 2 then continue to execute instructions in the program following "SBARRIER end" in parallel and in lockstep with each other.

It will be appreciated, that although not illustrated in FIG. 4, the shader program could include one or more further "barriered" sections of code, in which case the operation described above will apply as appropriate for each such section.

As discussed above, the operation described above can be achieved for any suitable shader program by including a thread exclusivity instruction in the program, in accordance with the technology described herein. For example, the shader program may be a vertex shader program and thus provide the function of e.g., the programmable vertex shader stage 27 illustrated in FIG. 2, when, e.g., executing on the programmable execution unit 302 illustrated in FIG. 3.

In the present embodiment, the shader program is a tiler program for tiling graphics primitives. Thus, in the present embodiment, the shader program provides the function of the programmable primitive list building unit 28 illustrated in FIG. 2 and described above, when executing on the programmable execution unit 302 illustrated in FIG. 3.

As discussed above, tiling includes a number of operations which must necessarily be performed in strict serial order. In particular, the tiling process can involve a first "serial" operation of fetching indices for primitives defined by a set of indices that includes primitive restarts, followed by a number of "parallel" operations that may be (and in an embodiment are) performed in a parallel manner, followed by a second "serial" operation of writing to primitive lists.

Accordingly, in the present embodiment, the tiler shader program includes a first "SBARRIER" instruction, followed by first "serial" section of code for fetching indices for primitives defined by a set of indices that includes primitive restarts, followed by a first "SBARRIER end" instruction. The program then includes a "parallel" section of code, followed by a second "SBARRIER" instruction, followed by second "serial" section of code for writing to primitive lists, followed by a second "SBARRIER end" instruction.

Figure 5:
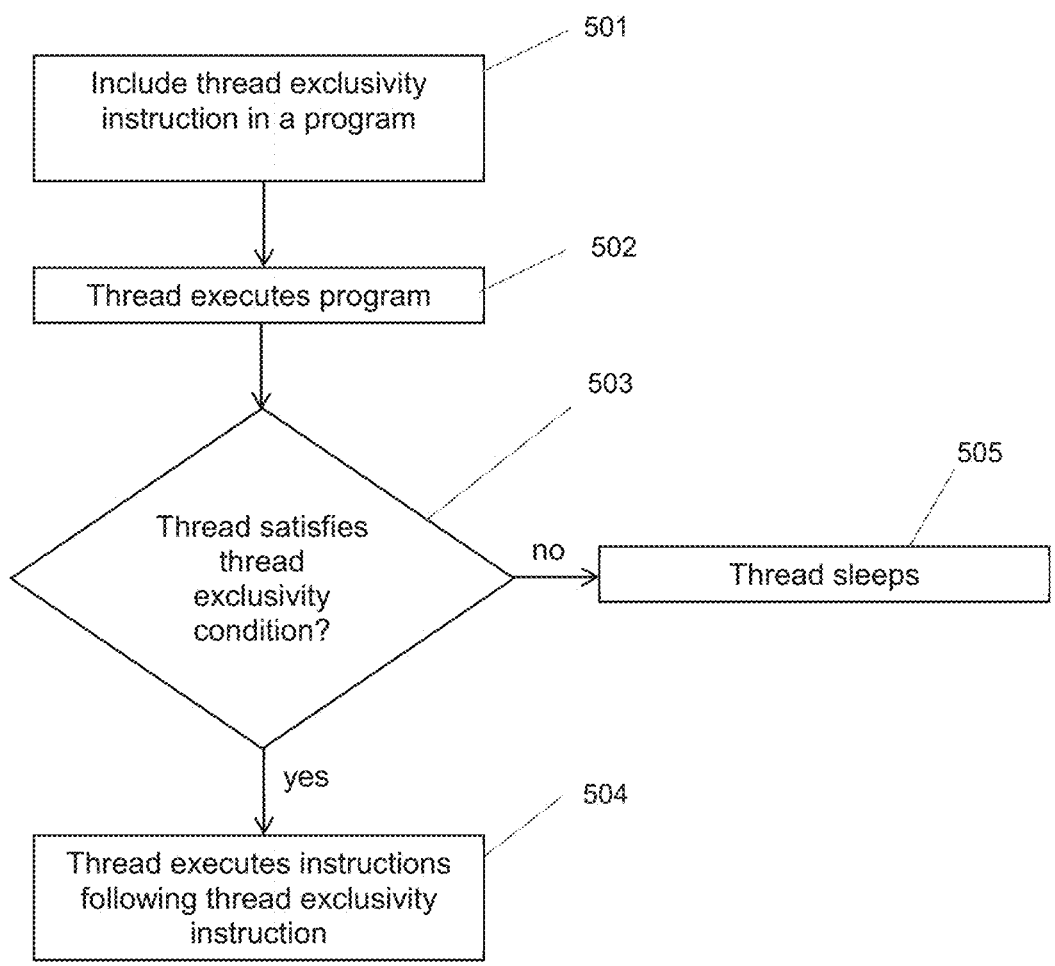
FIG. 5 shows schematically the operation of a data processing system in accordance with an embodiment of the technology described herein.

FIG. 5 shows schematically the operation of a data processing system in accordance with an embodiment of the technology described herein. As shown in FIG. 5, at step 501, a thread exclusivity instruction is included in a program. Then, at step 502, a thread of a processor of the data processing system executes the program. When the thread encounters the thread exclusivity instruction in the program, it is determined whether the thread satisfies a thread exclusivity condition (step 503), which condition can only be satisfied by a single execution thread (subset) at any one time. If the thread satisfies the condition, the thread executes a set of instructions in the program associated with the thread exclusivity instruction (step 504). Otherwise, at step 505, the thread sleeps without first executing those instructions.

The following pseudo code illustrates a shader program according to an embodiment, which includes a single "serial" section of code.

```
Typedef struct
{
    uint idx;
    uchar values[8];
} data_t;
void kernel(__global float *x, __global float *y, __global data_t *shared)
```

```
{
    const uint i = get_global_id(0);
    const uint sel = x[i] % 3;
    sbarrier.thread_id;
    shared[sel].values[shared[sel].idx] = y[i];
    shared[sel].idx++;
    sbarrier.end; // sbarrier imply memory fence
}
```

Here, instructions in between the thread exclusivity instruction ("sbarrier.thread_id") and the corresponding end instruction ("sbarrier.end") are "barriered" and are accordingly executed in the manner of the technology described herein.

The following pseudo code illustrates the operation of the control unit 303 keeping track of the status of threads executing the above shader program, according to an embodiment.

```
void notify_sbarrier(event_type, warp_state)
    if (event_type == SBARRIER)
        add_tracking_of_state(warp_state);
    if (event_type == SBARRIER_END)
        if (all_conditions_evaluated( ))
            notify_warp_state_to_wakeup(warp_state,
            warp_state.lane_active_mask);
    warp_state_to_wakeup, new_lane_active_mask =
    evaluate_condition( )
    if (warp_state_to_wakeup)
        notify_warp_state_to_wakeup (warp_state_to_wakeup,
        new_lane_active_mask);
```

Here, threads notify the control unit 303 of their status as illustrated by the following pseudo code.

```
case RUNNING:
    if (opcode == SBARRIER)
        notify_sbarrier(SBARRIER, warp_state);
        state = WAITING;
        save_lane_active_mask( );
    if (opcode == SBARRIER_END)
        notify_sbarrier(SBARRIER_END, warp_state);
        state = WAITING;
        memory_fence( ); // Make all memory transactions visible to
other threads case WAITING.
    if (event_wakeup)
        lane_active_mask = event.get_active_mask( );
        state = RUNNING;
```

The following pseudo code illustrates a shader program which performs tiling according to an embodiment.

```
typedef chunk_pointer
{
    uint chunk_id; // Which chunk in tiler_chunk_heap
    uint offset; // Offset into this 32 entry chunk
} chunk_pointer;
typedef struct pointer_array_entry
{
    chunk_pointer head;
    chunk_pointer tail;
} pointer_array_entry;
typedef struct pointer_array
{
    pointer_array_entry[/*num levels*/][/* num entries in level*/];
} pointer_array;
typedef uint[32] chunk;
typedef tiler_chunk_heap
```

```
{
    chunk chunks[/* Enough storage */];
} tiler_chunk_heap;
    __kernel void main(__global uint *index_buffer,
                __global vec3 *vertex_buffer,
                __global tiler_chunk_heap *polygon_list,
                __global pointer_array *pointer_array,
                __global uint *lock_ptr) // Global shared tracker variable. Needs to be
initialized to 0 before kernel starts.
{
    uint id = get_global_id(0);
    bool is_killed = false;
    // Primitive assembly
    // Index fetcher
    uint idx0 = index_buffer[3*id + 0];
    uint idx1 = index_buffer[3*id + 1];
    uint idx2 = index_buffer[3*id + 2];
    // Vertex fetcher (Load positions from vertex buffer.)
    vec4 v0 = vertex_buffer[idx0];
    vec4 v1 = vertex_buffer[idx1];
    vec4 v2 = vertex_buffer[idx2];
    if (!is_killed)
          is_killed |= bbox_gen( );
    if (!is_killed)
          is_killed |= binner( ); // Select which level to use in pointer_array
    if (!is_killed)
          is_killed |= iterator( );
    // Generate commands outside of barriered section.
    if (!is_killed)
          command_generator( ); // Generate num_commands and cmd[ ], see below.
    // Here starts barriered section.
    sbarrier(id);
    if (!is_killed)
    {
        // This primitive does not generate any output
        continue; // continue after sbarrier_end( );
    }
    // Get which chunk entry to write to
    chunk_pointer *ptr = pointer_array[level][bin].tail;
    // Write commands to polygon list
    for (uint i = 0; i < num_commands; i++)
    {
        // OOM: Add suitable check for out of memory.
        if (ptr->offset == 127)
        {
            chunk_pointer *newptr = allocate_new_chunk( );
            polygon_list.chunks[ptr->chunk_id][127] = newptr->chunk_id;
            ptr = newptr;
        }
        polygon_list.chunks[ptr->chunk_id][ptr->offset++] = cmd[i];
    }
    sbarrier_end( ); // sbarrier_end( ) imply memory fence
}
```

In this embodiment, writing to primitive lists is performed in a serial manner using a thread exclusivity instruction ("sbarrier(id)") and corresponding end instruction ("sbarrier_end( )") to create a "barriered" section of code. Instructions within the "barriered" section of code are kept to a minimum, since only one "lane" (execution thread) will be active to execute such instructions at any one time.

In this embodiment, instructions for primitive assembly are not included within a "barriered" section of code. However, were primitive restarts to be used, another "barriered" section of code could be included to ensure the desired serial operation.

It can be seen from the above, the technology described herein, in embodiments at least, provides a mechanism whereby instructions within a shader program can be executed by execution threads of a shader in a serial order (one execution thread at a time). This is achieved in embodiments of the technology described herein at least by including a "thread exclusivity instruction" within a shader program, which instruction causes execution threads to determine whether they satisfy an associated "thread exclusivity condition" before continuing with the execution of subsequent instructions in the program, and which condition can only be satisfied by a single execution thread at any one time.

Although the above has been described with particular reference to the "thread exclusivity condition" only being able to be satisfied by a single execution thread at any one time, in other embodiments the "thread exclusivity condition" can satisfied by a subset of plural execution threads, such as a thread group ("warp"), or a subset of threads within a thread group (e.g. "quad"), at the same time. Thus, according to an embodiment, a "thread exclusivity instruction" according to the technology described herein is used to cause plural different subsets of one or more execution threads to execute instructions within a program in a serial order (one execution thread subset at a time).

Although the above has been described with particular reference to a graphics shader program executing on a graphics processor (GPU), in other embodiments a "thread exclusivity instruction" according to the technology described herein is included in a program for execution by another multi-threaded processor, e.g. a multi-threaded CPU, in response to which instruction the multi-threaded processor (e.g. CPU) operates in the manner of the technology described herein, e.g. and in an embodiment such that a set of instructions in the program are executed by one execution thread (subset) at a time.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that comprises a processor operable to execute programs to perform processing operations, and in which a program can be executed by plural execution threads at the same time, the method comprising:

including in a program to be executed by the processor an instruction which when executed by an execution thread of a set of plural execution threads that includes plural subsets of one or more execution threads will cause the execution thread to:

determine whether the execution thread satisfies a condition associated with the instruction, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program;

the method further comprising, when the processor is executing the program, each execution thread of a set of plural execution threads that includes plural subsets of one or more execution threads that are executing the program, in response to the instruction:

determining whether the respective execution thread satisfies the condition associated with the instruction, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads;

when it is determined that the respective execution thread satisfies the condition, executing the set of one or more instructions associated with the instruction in the program; and when it is not determined that the respective execution thread satisfies the condition, sleeping without first executing the set of one or more instructions associated with the instruction in the program; and then when the respective execution thread satisfies the condition, executing the set of one or more instructions associated with the instruction in the program, such that the set of one or more instructions associated with the instruction is executed by the different subsets of one or more execution threads in the selected order.

2. The method of claim 1, wherein the set of one or more instructions is associated with the instruction by the set of one or more instructions being included in the program following the instruction.

3. The method of claim 1, wherein the instruction is visible to an application program interface for the program.

4. The method of claim 1, wherein the data processing system is a tile-based graphics processing system, the program is for tiling graphics primitives, and the set of one or more instructions associated with the instruction include one or more instructions to perform one or more tiling operations; and wherein the method comprises, each execution thread of the set of plural execution threads, in response to the set of one or more instructions associated with the instruction:

performing the one or more tiling operations.

5. The method of claim 1, wherein the condition is such that the plural subsets of one or more execution threads will satisfy the condition in an order based on thread age.

6. The method of claim 1, wherein determining whether an execution thread satisfies the condition comprises the execution thread sending a message to a thread exclusivity control unit of the data processing system, and the thread exclusivity control unit determining whether the execution thread satisfies the condition and sending a corresponding return message to the execution thread when the execution thread satisfies the condition.

7. The method of claim 1, further comprising:

in response to an execution thread that is executing the set of one or more instructions associated with the instruction in the program finishing executing the set of one or more instructions, awakening an execution thread that is sleeping in response to the instruction to execute the associated set of one or more instructions.

8. The method of claim 7, wherein awakening a sleeping execution thread comprises a thread exclusivity control unit of the data processing system sending a message to the sleeping execution thread to awaken the sleeping execution thread.

9. The method of claim 1, wherein execution threads are grouped into respective thread groups and execution threads within a thread group are operable to execute instructions in a program in lockstep, the method further comprising:

once an execution thread has finished executing the set of one or more instructions, the execution thread waiting for all other execution threads within the same thread group to finish executing the set of one or more instructions before continuing executing subsequent instructions in the program.

10. The method of claim 1, wherein the set of plural execution threads comprises a first execution thread and a second execution thread, and the method comprises:

the first execution thread satisfying the condition and beginning executing the set of one or more instructions associated with the instruction before the second execution thread executes the instruction.

11. A data processing system, the system comprising:
a processor comprising a programmable execution unit operable to execute programs to perform processing operations, and in which a program can be executed by plural execution threads at the same time; and
processing circuitry configured to include in a program to be executed by the processor an instruction which when executed by an execution thread of a set of plural execution threads that includes plural subsets of one or more execution threads will cause the execution thread to:
determine whether the execution thread satisfies a condition associated with the instruction, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads; and to:
when it is determined that the execution thread satisfies the condition, execute a set of one or more instructions associated with the instruction in the program; and
when it is not determined that the execution thread satisfies the condition, sleep without first executing the set of one or more instructions associated with the instruction in the program;
wherein the programmable execution unit of the processor is configured such that, each execution thread of a set of plural execution threads that includes plural subsets of one or more execution threads in response to the instruction in a program being executed by the execution thread will:
determine whether the respective execution thread satisfies the condition associated with the instruction, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads;
when it is determined that the respective execution thread satisfies the condition, execute a set of one or more instructions associated with the instruction in the program; and
when it is not determined that the respective execution thread satisfies the condition, sleep without first executing the set of one or more instructions associated with the instruction in the program; and then when the respective execution thread satisfies the condition, execute the set of one or more instructions associated with the instruction in the program, such that the set of one or more instructions associated with the instruction is executed by the different subsets of one or more execution threads in the selected order.

12. The system of claim 11, wherein the processing circuitry is configured to associated the set of one or more instructions with the instruction by including the set one or more instructions in the program following the instruction.

13. The system of claim 11, wherein the instruction is visible to an application program interface for the program.

14. The system of claim 11, wherein the data processing system is a tile-based graphics processing system, the program is for tiling graphics primitives, and the set of one or more instructions associated with the instruction include one or more instructions to perform one or more tiling operations; and wherein the programmable execution unit of the processor is configured such that, each execution thread of the set of plural execution threads, in response to the set of one or more instructions associated with the instruction will:
perform the one or more tiling operations.

15. The system of claim 11, wherein the condition is such that the plural subsets of one or more execution threads will satisfy the condition in an order based on thread age.

16. The system of claim 11, wherein the system further comprises a thread exclusivity control unit, and determining whether an execution thread satisfies the condition comprises:
the execution thread sending a message to the thread exclusivity control unit, and the thread exclusivity control unit determining whether the execution thread satisfies the condition and sending a corresponding return message to the execution thread when the execution thread satisfies the condition.

17. The system of claim 11, comprising:
a thread awakening circuit configured to, in response to an execution thread that is executing the set of one or more instructions associated with the instruction in the program finishing executing the set of one or more instructions, awaken an execution thread that is sleeping in response to the instruction to execute the associated set of one or more instructions.

18. The system of claim 11, wherein execution threads are grouped into respective thread groups and execution threads within a thread group are operable to execute instructions in a program in lockstep; and
the system is configured such that once an execution thread has finished executing the set of one or more instructions, the execution thread waits for all other execution threads within the same thread group to finish executing the set of one or more instructions before continuing executing subsequent instructions in the program.

19. A processor comprising:
a programmable execution unit operable to execute programs to perform processing operations, and in which a program can be executed by plural execution threads at the same time; and
a processing circuit configured such that each execution thread of a set of plural execution threads that includes plural subsets of one or more execution threads will, in response to executing an instruction in a program that has an associated condition, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads:
determine whether the respective execution thread satisfies the condition associated with the instruction, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads;

when it is determined that the respective execution thread satisfies the condition, execute a set of one or more instructions associated with the instruction in the program; and when it is not determined that the respective execution thread satisfies the condition, sleep without first executing the set of one or more instructions associated with the instruction in the program; and then when the respective execution thread satisfies the condition, execute the set of one or more instructions associated with the instruction in the program, such that the set of one or more instructions associated with the instruction is executed by the different subsets of one or more execution threads in the selected order.

20. A non-transitory computer readable storage medium storing software code which when executing on a processor performs a method of compiling a program to be executed by a processor, the processor being operable to execute a program by plural execution threads executing the program at the same time, the method comprising:

including in a program to be executed by the processor an instruction which when executed by an execution thread of a set of plural execution threads that includes plural subsets of one or more execution threads will cause the execution thread to:

determine whether the execution thread satisfies a condition associated with the instruction, the condition being such that only one subset of the plural subsets of one or more execution threads will satisfy the condition at any one time, and such that different subsets of the plural subsets of one or more execution threads will satisfy the condition in a selected order of the subsets of the plural subsets of one or more execution threads; and to:

when it is determined that the execution thread satisfies the condition, execute a set of one or more instructions associated with the instruction in the program; and when it is not determined that the execution thread satisfies the condition, sleep without first executing the set of one or more instructions associated with the instruction in the program.

* * * * *